(12) United States Patent
Burger et al.

(10) Patent No.: US 8,402,858 B2
(45) Date of Patent: Mar. 26, 2013

(54) GEARSHIFT DEVICE FOR CHANGE-SPEED GEARBOXES OF MOTOR VEHICLES

(75) Inventors: Hans-Jürgen Burger, Nauheim (DE); Thorsten Hahn, Gau-Odemheim (DE); Axel Geiberger, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 857 days.

(21) Appl. No.: 12/491,555

(22) Filed: Jun. 25, 2009

(65) Prior Publication Data

US 2010/0024585 A1 Feb. 4, 2010

(30) Foreign Application Priority Data

Jun. 25, 2008 (DE) .................. 10 2008 030 233

(51) Int. Cl.
*F16H 59/04* (2006.01)

(52) U.S. Cl. .................. 74/473.21; 74/473.33; 74/532

(58) Field of Classification Search ............... 74/473.21, 74/473.22, 473.23, 473.28, 532, 533
See application file for complete search history.

(56) References Cited

U.S. PATENT DOCUMENTS

| 1,482,154 | A | * | 1/1924 | Saxton | 70/206 |
| 1,866,309 | A | * | 7/1932 | Johnson | 70/251 |
| 5,682,777 | A | * | 11/1997 | Specht | 70/247 |
| 6,202,503 | B1 | * | 3/2001 | Miller | 74/525 |

FOREIGN PATENT DOCUMENTS

| DE | 4441826 A1 | 6/1995 |
| DE | 10012382 A1 | 3/2001 |
| DE | 102004018244 A1 | 1/2005 |
| DE | 202005008178 U1 | 8/2005 |
| JP | 11048815 A | 2/1999 |

* cited by examiner

*Primary Examiner* — William C Joyce
(74) *Attorney, Agent, or Firm* — Ingrassia Fisher & Lorenz, P.C.

(57) ABSTRACT

A gearshift device for a change-speed gearbox of a motor vehicle, includes, but is not limited to a gearshift lever guided movably between positions corresponding to different gears, on which a locking member is displaceable between a locking position in a first degree of freedom in which it blocks any movement of the gearshift lever from a forward gear position into a reverse gear position, and a release position in a first degree of freedom in which it allows movement from the forward gear position into the reverse gear position. The locking member on the gearshift lever is movable in a second degree of freedom between a normal position in which movement between release position and locking position is possible and an alignment position in which it fixes the gearshift lever free from play.

9 Claims, 2 Drawing Sheets

GEARSHIFT DEVICE FOR CHANGE-SPEED GEARBOXES OF MOTOR VEHICLES

CROSS-REFERENCE TO RELATED APPLICATION

This application claims priority to German Patent Application. No. 102008030233.3, filed Jun. 25, 2008, which is incorporated herein by reference in its entirety.

TECHNICAL FIELD

The present invention relates to a gearshift device for a change-speed gearbox of motor vehicles comprising a gearshift lever and a so-called reverse gear block.

BACKGROUND

The gearshift lever located in the passenger compartment of a motor vehicle after installing the gearshift device is guided movably between positions which correspond to various gears of the change-speed gearbox. A coupling device such as a linkage or cable controls extends between the gearshift device and the change-speed gearbox in order to couple the position of gearshift forks of the change-speed gearbox to the position of the gearshift device. In order to ensure that one of the predefined positions of the gearshift lever actually corresponds exactly to a configuration of the gearshift forks in which a desired gear is engaged, an alignment of the coupling device is required. In order to be able to perform such an alignment exactly, it is desirable to be able to immobilize the gearshift lever in at least one position free from play.

It is known to implement a reverse gear block by providing a longitudinally displaceable hook on the gearshift lever, which, when the gearshift lever approaches its position corresponding to the reverse gear, impacts against a barrier in order to prevent any accidental engagement of reverse gear, which can overcome the barrier by displacement along the shaft of the gearshift lever and which prevents accidental disengagement of reverse gear by engaging behind the barrier. In order that the engagement of the gear behind the barrier takes place reliably, it must retain some play. Consequently, the gearshift lever is not completely immovable in the reverse gear position. The conventional locking of the gearshift lever in the reverse gear position is therefore not suitable for sufficiently immobilizing the gearshift lever for the purpose of alignment.

At least one object of the present invention is to provide a gearshift device which allows play-free immobilization of the gearshift lever for the alignment but at the same time allows the necessary play in the function mode. In addition, other objects, desirable features and characteristics will become apparent from the subsequent summary and detailed description, and the appended claims, taken in conjunction with the accompanying drawings and this background.

SUMMARY

The at least one object, other objects, desirable features and characteristics, are achieved whereby in a gearshift device for a change-speed gearbox of a motor vehicle having a gearshift lever guided movably between positions corresponding to different gears. A locking member on the gearshift lever is displaceable in a first degree of freedom, the locking member on the gearshift lever is movable in a first degree of freedom between a normal position in which it allows a shifting movement of the gearshift lever and an alignment position in which it fixes the gearshift lever free from play.

The locking member is preferably additionally movable in a second degree of freedom between a locking position in which it blocks a shifting movement of the gearshift lever from a forward gear position into a reverse gear position, and a release position in which it allows movement from the forward gear position into the reverse gear position.

The locking member is preferably a sleeve surrounding a shaft of the gearshift lever. The first degree of freedom of the locking member is preferably a rotation about the shaft, the second degree of freedom is a movement in the longitudinal direction of the shaft.

In order to achieve freedom of play in the alignment position and to retain some play in the normal position, the locking member and shaft each have a contoured side surface, and in the normal position the contours of the contoured side surface intermesh in a complementary manner, whereas in the alignment position they do not do this.

If the first degree of freedom is a rotation as mentioned above, a changeover between engagement and nonengagement of the contours can easily be achieved by the contoured side surfaces of the locking member and the shaft not lying opposite to one another in the alignment position. Instead, in the alignment position projecting contours of the locking member or the shaft preferably contact a flat side surface of the shaft or the locking member.

In order to be able to transfer the sleeve forming the locking member from the normal position into the alignment position without needing to detach this from the shaft, the shaft preferably comprises a section guiding the sleeve in a rotationally fixed manner, and a section allowing a rotation of the sleeve about the shaft when the sleeve is located at the height of said shaft. In the release position, however, the sleeve is preferably located on the guiding section.

A spring can be provided to act upon the sleeve along the shaft from the section allowing rotation in the direction of the guiding section. This ensures that the sleeve cannot accidentally arrive at the section allowing rotation.

In order to unlock the locking member when using the locking member as a reverse gear block and be able to switch between forward and reverse gear, a control element coupled to the sleeve is preferably attached to a handle of the gearshift lever.

The freedom of movement of the control element is preferably not sufficiently large to entrain the sleeve into the section allowing rotation. The driver cannot therefore accidentally change over between the alignment and the normal position; if, however, the locking member is exposed during assembly of the vehicle or during a repair, such a changeover can be performed conveniently by pulling the locking member on the section allowing rotation and turning it there.

As further security against an undesirable transition of the locking member onto the section allowing rotation, a latching device can be provided, which can be engaged by a movement of the locking member from the section allowing rotation to the guiding section. Such a latching device can preferably only be engaged when the locking member is located in the alignment position.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
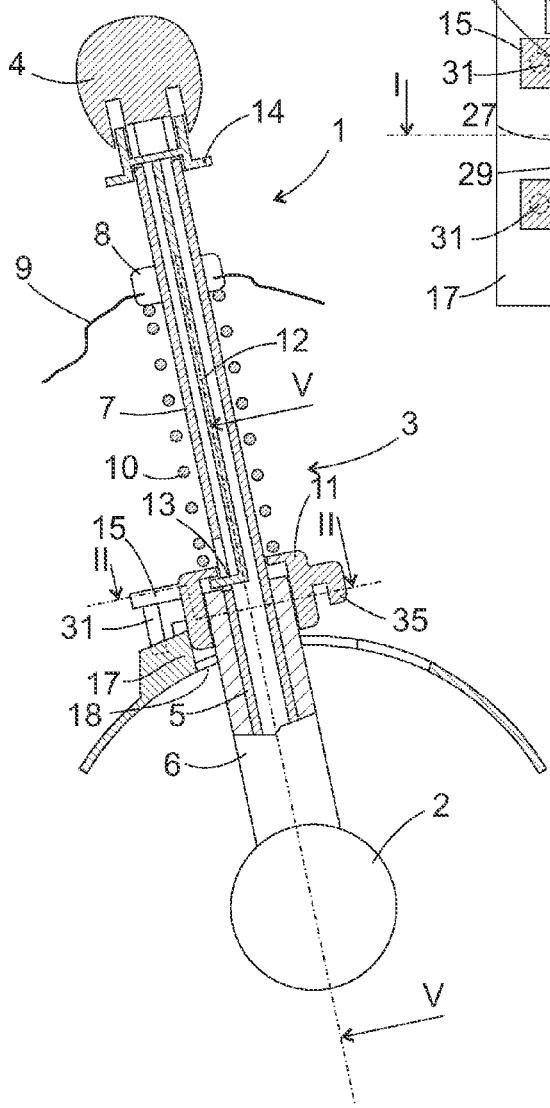
FIG. 1 shows a section through a gearshift device according to the invention in the longitudinal direction of its gearshift lever.

The sectional view in FIG. 1 shows a gearshift lever 1, which is mounted in a holder of a motor vehicle fixed to the bodywork, not shown in detail, so that it is pivotable by means of a ball joint 2 or another joint in two degrees of freedom, hereafter designated as selecting or shifting degree of freedom. The gearshift lever 1 has an elongate shaft 3, which has a handle 4 at its end facing away from the ball joint 2. The shaft 3 is substantially composed of a cylindrical tube 5 extending between the ball joint 2 and the handle 4 and a guiding body 6 of approximately square cross section, which encloses a lower section of the tube 5 adjacent to the ball joint 2.

A flexible bellows 9 surrounds an upper section 7 of the shaft 3 protruding from the guiding body 6 and is fastened to the guiding body by means of a peripheral collar 8. The shaft extends through an opening in a transmission tunnel not shown and the outer edge of the bellows 9 is connected to the edge of the opening to close off the interior of the transmission tunnel toward the passenger compartment.

A helical spring 10 is supported on the collar 8, which helical spring acts upon a locking sleeve 11 displaceable on the shaft 3 against the guiding body 6 so that the guiding body 6 engages in an internal cavity of the locking sleeve 11.

A pull rod 12 extends in the hollow interior of the shaft 3. A hook 13 angled at one end of the pull rod 12 engages through a slot of the tube 5 into the interior of the locking sleeve 11. An upper end of the pull rod 12 is connected to an actuating ring 14, which is mounted displaceably below the handle 4 on the shaft 3.

The locking sleeve 11 has two hooks 15 on one side, which, in the configuration shown, engage with their cylindrical tip 31 parallel to the shaft 3 in a manner free from play in a hole on an oblique surface facing away from the shaft 3 of a fixed web 17 in relation to the transmission tunnel. A hook 35 on the opposite side of the locking sleeve 11 does not engage.

The web 17 is here part of a guiding link in which shift and select gates orthogonal to one another are cut out in a manner known per se to guide the movement of the shaft 3 extending through these gates in the shifting or selecting degree of freedom. The select gate extends in the plane of intersection of FIG. 1. In the configuration shown the gearshift lever 1 is located at the end of the select gate 18, from which the shift gate of the reverse gear branches off. Due to the engagement of the two tips 31 in the holes of the web 17, the locking sleeve 11 is fixed free from play on the shift link in the shifting degree of freedom and in the selecting degree of freedom.

Figure 2:
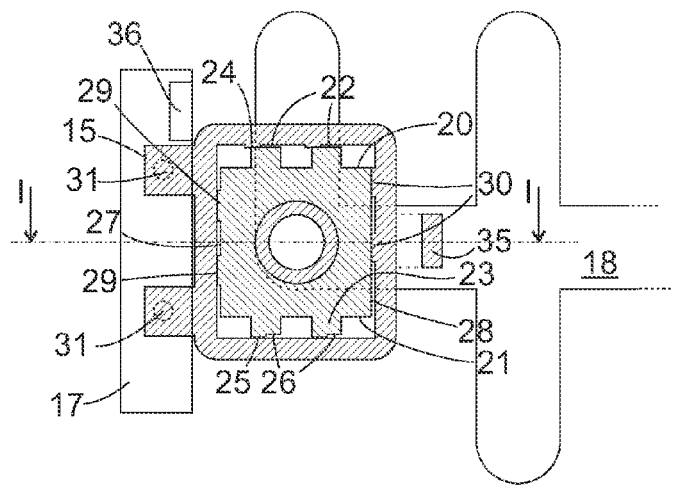
FIG. 2 shows a section transverse to the gearshift lever along the plane designated by II-II in FIG. 1 which shows the locking member in the alignment position.

FIG. 2 shows a section through the locking sleeve 11 and the shaft 3 in the configuration of FIG. 1 along the plane designated by II-II in FIG. 1. The guiding body 6 has a substantially rectangular cross-section with ribs 22, 23 projecting on two opposite side surfaces 20, 21. The ribs 22 on the side surface 20 each have a flat front face parallel to the side surface 20, which each has a flat rib 24 on an inner side of the locking sleeve 11 opposite to a part of its width. The ribs 23 have a stepped front surface beyond over the side surface 21. The respectively further projecting sections 25 abut against the inner surface of the locking sleeve 11.

The other two opposite side surfaces 27, 28 of the guiding body 6 have a different length to the side surfaces 20, 21. The side surface 27 is provided with flat ribs 29 while the other side surface 28 is flat. The flat side surface 28 contacts ribs 30 of an opposite inner surface of the locking sleeve 11 while the ribs 29 contact a flat inner surface of the locking sleeve 11. The locking sleeve 11 thus rests free from play on the guiding body 6. In this way, the gearshift lever 1 is fixed free from play in its two degrees of freedom and a coupling device, not shown, which is known per se, and connects the gearshift lever 1 to the gearshift forks of the change-speed gearbox can be aligned without the gearshift lever 1 yielding to the forces which occur during alignment.

After the alignment, the fixing of the gearshift lever 1 is released by grasping the locking sleeve 11 by the hand and lifting it sufficiently far against the restoring force of the helical spring 10 that the guiding body 6 no longer engages in the locking sleeve 11. In this position, the locking sleeve 11 is freely rotatable about the shaft 3. If this is turned through approximately 180° and then released, it slides onto the guiding body 6 again in the orientation shown in cross section in FIG. 3 and shown in longitudinal section in FIG. 4. The flat side surface 28 and the side surface 20 with unstepped ribs 22 now lie opposite flat inner surfaces of the locking sleeve 11, the ribs 24 lie opposite the sections 26, and the ribs 30 each engage between the ribs 29. The engagement of the guiding body 6 in the locking sleeve 11 is thus play-retaining transversely to the shaft 3 in two directions, in the shifting and in the selecting degree of freedom, so that there is no risk of the locking sleeve 11 jamming on the guiding body 6.

Figure 3:
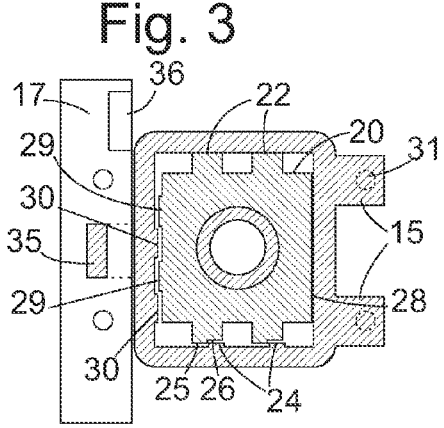
FIG. 3 shows a section similar to FIG. 2 with the locking member in the normal position.
Figure 4:
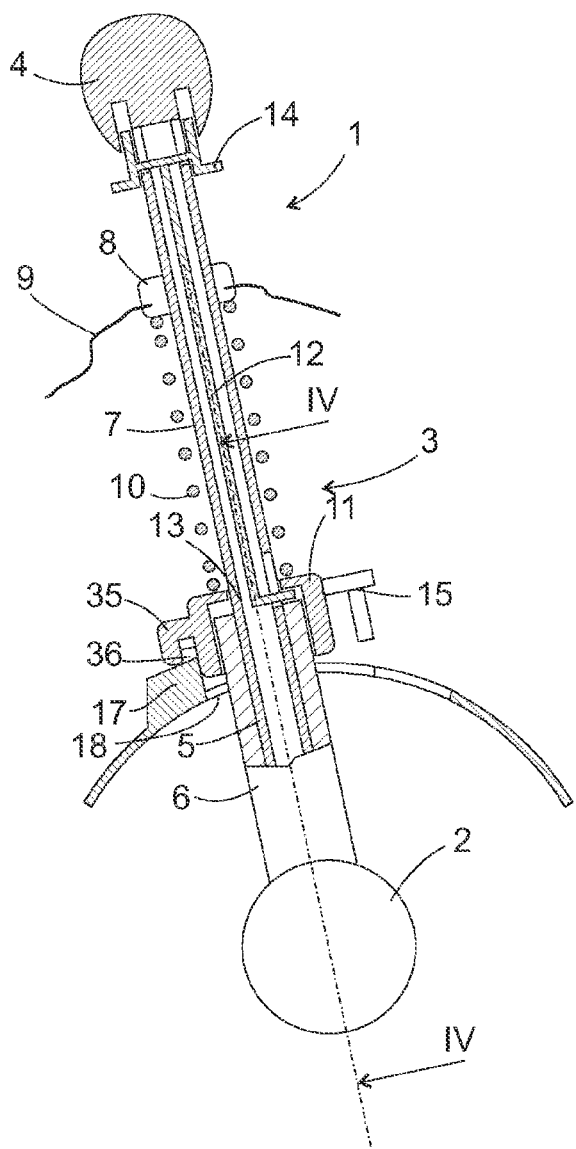
FIG. 4 shows a section similar to FIG. 1 with the locking member in the normal position.

The holes in the web 17 which can be identified in the plan view in FIG. 3 are now empty; the hooks 15 do not engage on the side of the locking sleeve 11 facing away from the web 17. Instead, a short rib 36 is formed on the web 17.

When the gearshift lever is moved from the alignment position at the end of the select gate 18 into the shift gate of the reverse gear running parallel to the web 17, the hook 35 slides along on the web 17 and ultimately engage behind the rib 36. If, on the other hand, it is moved into the select gate, the hook 35 jumps down from the web 17. A movement of the gearshift lever 1 back to the end of the select gate is only possible if the locking sleeve 11 is raised by pulling up the actuating ring 14.

As the preceding description shows, the locking sleeve 11 provides a double function in this gearshift device, on the one hand, in the orientation in FIG. 2 it serves as a play-free fixing of the gearshift lever 1 which allows alignment of the coupling device and on the other hand, in the orientation in FIG. 3, it functions as a reverse gear block which retains play with respect to the guiding body 6 in order to be reliably movable along the shaft 3 and reliably return to the locking position when the actuating ring 14 is released.

The restoring force of the helical spring 10 can be sufficient to reliably prevent the case that, when the actuating ring 14 is pulled up and the locking sleeve 11 is in its release position, the locking sleeve 11 is moved so far upward that it loses its engagement with the guiding body 6 and becomes rotatable.

In order that pulling up the actuating ring 14 is not made unnecessarily difficult for the driver, it can however be desirable to make the restoring force of the helical spring 10 small.

Figure 5:
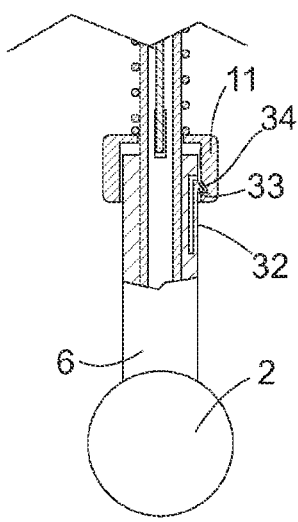
FIG. 5 shows a partial section of the gearshift device along the longitudinal axis of the gearshift lever in a plane perpendicular to the plane of intersection of FIG. 1.

FIG. 5 shows a partial section through the gearshift device 1 along the plane designated by V-V in FIG. 1. Formed inside the guiding body 6 is a resilient tongue 32 extending in the longitudinal direction of the shaft 3, which has a beveled latching projection 33 at its tips. When the locking sleeve 11 is located in the orientation in FIG. 2, the tip of the latching projection 33 dips into a recess 34 on an inner surface of the locking sleeve 11. The locking sleeve 11 cannot therefore slip away from the guiding body 6. This is particularly advantageous when the shaft 3 with tube 5, guiding body 6, and ball joint 2 but without the handle 4 forms a preassembled structural unit, which is to be mounted in the vehicle in its entirety since loss of the locking sleeve 11 before attachment of the handle 4 can thus be prevented.

Nevertheless, the locking sleeve 11 can be pulled away from the guiding body 6 after alignment with no difficulties since a large part of the tongue 32 is exposed below the locking sleeve 11 and can be pressed in by hand to cancel the latching and pull the locking sleeve upwards from the guiding body 6. Finally, the locking sleeve 11 can be turned through approximately 180° and placed on the guiding body 6 again to produce the normal position.

In the normal position, an internal surface of the locking sleeve 11, having no recess 34, is located opposite the latching projection 33. In the normal position, therefore latching is not possible but also is not necessary.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A gearshift device for a change-speed gearbox of a motor vehicle, comprising:
    a gearshift lever guided movably between a plurality of positions corresponding to a plurality of different gears; and
    a locking member on the gearshift lever that is displaceable in a first degree of freedom,
    wherein said locking member is movable in the first degree of freedom between a normal position allowing a shifting movement of the gearshift lever and an alignment position that substantially fixes the gearshift lever free from play,
    wherein the locking member comprises a sleeve surrounding a shaft of the gearshift lever, a section guiding the sleeve in a rotationally fixed manner, and a section allowing a rotation of the sleeve about the shaft and the locking member is movable in a second degree of freedom between a locking position blocking the shifting movement of the gearshift lever from a forward gear position into a reverse gear position, and a release position allowing movement from the forward gear position into the reverse gear position.

2. The gearshift device according to claim 1, wherein the first degree of freedom is a rotation about a shaft.

3. The gearshift device according to claim 1, wherein the second degree of freedom of the locking member is a movement in a longitudinal direction of a shaft.

4. The gearshift device according to claim 1, wherein the locking member and a shaft each have at least one contoured side surface, that in the normal position a plurality of contours of the contoured side surface intermesh in a complementary manner, and in the alignment position the plurality of contours intermesh in a noncomplementary manner.

5. The gearshift device according to claim 4, wherein in the alignment position a projecting contour contacts a flat side surface.

6. The gearshift device according to claim 1, wherein in a release position the sleeve is located on the section.

7. The gearshift device according to claim 1, wherein a spring acts upon the sleeve along the shaft from the section allowing rotation in a direction of the section.

8. The gearshift device according to claim 1, wherein a control element coupled to the sleeve is attached to a handle of the gearshift lever and that a freedom of movement of the control element is not sufficiently large to entrain the sleeve into the section allowing rotation.

9. The gearshift device according to claim 1, wherein a latching device is provided, which can be engaged by a movement of the locking member from the section allowing rotation to the section to prevent return of the locking member to the section allowing rotation.

\* \* \* \* \*